(12) United States Patent
Karstens et al.

(10) Patent No.: US 11,333,242 B2
(45) Date of Patent: May 17, 2022

(54) PISTON-CYLINDER ASSEMBLY

(71) Applicant: WABCO GmbH, Hannover (DE)

(72) Inventors: Hauke Karstens, Kiel (DE); Dennis Reimann, Hannover (DE)

(73) Assignee: WABCO GmbH, Hannover (DE)

( * ) Notice: Subject to any disclaimer, the term of this patent is extended or adjusted under 35 U.S.C. 154(b) by 165 days.

(21) Appl. No.: 16/956,019

(22) PCT Filed: Sep. 24, 2018

(86) PCT No.: PCT/EP2018/075748
§ 371 (c)(1),
(2) Date: Jun. 19, 2020

(87) PCT Pub. No.: WO2019/120653
PCT Pub. Date: Jun. 27, 2019

(65) Prior Publication Data
US 2020/0318734 A1    Oct. 8, 2020

(30) Foreign Application Priority Data

Dec. 21, 2017 (DE) ................. 10 2017 011 895.7

(51) Int. Cl.
*F16H 61/30* (2006.01)
*F16H 61/28* (2006.01)
*F15B 11/12* (2006.01)

(52) U.S. Cl.
CPC ......... *F16H 61/30* (2013.01); *F16H 61/2807* (2013.01); *F15B 11/123* (2013.01);
(Continued)

(58) Field of Classification Search
CPC .... F15B 11/123; F16H 61/30; F16H 61/2807; F16H 2061/2823; F16H 2061/307; F16H 2061/308
(Continued)

(56) References Cited

U.S. PATENT DOCUMENTS

| | | | | |
|---|---|---|---|---|
| 4,524,641 A | * | 6/1985 | Greenwood | ............ F16H 15/38 476/10 |
| 7,083,034 B2 | * | 8/2006 | Bader | ................... F15B 15/204 192/109 F |
| 10,060,528 B2 | * | 8/2018 | Novak | ................ F16H 63/3023 |

FOREIGN PATENT DOCUMENTS

| | | |
|---|---|---|
| DE | 2914334 A1 | 10/1979 |
| DE | 4038170 A1 | 6/1992 |

(Continued)

OTHER PUBLICATIONS

European Patent Office, Rijswijk, Netherlands, International Search Report of International Application No. PCT/EP2018/075748, dated Jan. 22, 2019, 2 Pages.

*Primary Examiner* — Ha Dinh Ho
(74) *Attorney, Agent, or Firm* — Dickinson Wright PLLC

(57) ABSTRACT

A piston-cylinder assembly (1) has a cylindrical housing (3), with a main piston (2) and at least one trailing piston (11, 12). The trailing piston (11, 12) is axially guided on a cylindrical outer lateral face (38) of the main piston (2). The trailing piston (11, 12) has a thrust portion (13, 14) at one end near a piston web on the main piston, The thrust portion extends axially inward toward the piston web (10) A travel limiter (28) on the cylindrical housing limits a travel range of the trailing piston (11, 12) Under pressure, the trailing piston (11, 12) follows the main piston (2) until the trailing piston (11, 12) hits the travel limiter (28). The thrust portion (13, 14) of the trailing piston (11, 12) is shaped to fit into an associated recess (30, 31) in the piston web with a positive lock.

10 Claims, 3 Drawing Sheets

(52) U.S. Cl.
CPC .............. *F16H 2061/2823* (2013.01); *F16H 2061/307* (2013.01); *F16H 2061/308* (2013.01)

(58) Field of Classification Search
USPC .......................................................... 74/335
See application file for complete search history.

(56) References Cited

FOREIGN PATENT DOCUMENTS

| | | |
|---|---|---|
| DE | 102004022723 A1 | 11/2005 |
| DE | 102010011239 A1 | 9/2011 |
| DE | 102017003017 A1 | 10/2018 |
| GB | 1142506 A | 2/1969 |
| WO | 2017050356 A1 | 3/2017 |

* cited by examiner

PISTON-CYLINDER ASSEMBLY

TECHNICAL FIELD

The invention relates to a piston-cylinder assembly which can be actuated by applying pressure by means of a fluid and can be used for example as a transmission actuator having three shift positions for the shift mechanism of an automatic transmission.

BACKGROUND

A piston-cylinder assembly of this type conventionally comprises a main piston which is received in an axially displaceable manner in a cylindrical housing and is doubly effective, which piston can be displaced between two end positions and a central position by means of two trailing pistons by filling and emptying two axially opposing pressure chambers. For this purpose, the trailing pistons can be carried along in each case in an axial direction as far as an axially central, stationary travel limiter. If, for example, the first pressure chamber is filled with a pressurized fluid, and the second pressure chamber is emptied, the main piston approaches one of the two end positions, the trailing piston to which pressure is likewise applied remaining at the travel limiter, and the main piston continuing to move, carrying along the other trailing piston, as far as an end stop in the cylindrical housing. The same applies to the opposite axial direction. By applying pressure to the two pressure chambers, the main piston approaches the central position and, in this position, can be kept in a force equilibrium. The two trailing pistons are conventionally guided radially outward on the main piston in an axially displaceable manner. For the trailing pistons to carry along the main piston, an annular-web-shaped protrusion is arranged or formed on the main piston, which protrusion extends radially outward, and by means of which the two trailing pistons are axially separated from one another. The two trailing pistons each have a thrust portion pointing toward the piston protrusion. In order to carry along the main piston in the respective axial actuating direction, the piston web interacts with the thrust portion of the respective trailing piston.

A piston-cylinder assembly 1.1 of this type, which is known from DE 10 2017 003 017.0, which was previously unpublished, is shown in FIG. 4. This known piston-cylinder assembly 1.1 is used for the shift mechanism of an automatic transmission. The assembly has a main piston 2.1, which in the document is in the form of a shift piston, which is arranged in a cylindrical housing 3 in the form of a shift cylinder coaxially to the longitudinal axis 4 of the piston-cylinder assembly 1.1 in a slidably movable manner. The main piston 2.1 moves in a piston chamber 7 of the cylindrical housing 3 between a first end stop face 5 and a second end stop face 6, the main piston 2.1 dividing the piston chamber 7 into two pressure chambers 8, 9 which have a variable volume, to which compressed air can be applied, and which are sealed with respect to one another.

The two pressure chambers 8, 9 of the piston chamber 7 are attached to a valve unit, which has a first 3/2-way solenoid valve 15, which is connected by means of a first pneumatic connection line 16 to the first pressure chamber 8. A second 3/2-way solenoid valve 17 is connected to the second pressure chamber 9 by means of a second pneumatic connection line 18. The two pressure chambers 8, 9 can be connected to a compressed air supply (not shown). For ventilation to the surroundings, the pressure chambers 8, 9 and the piston chamber 7 can be connected to a vent line (likewise not shown).

Axially centrally, the main piston 2.1 has a circular, radially outwardly extending piston web 10.1, which axially separates two substantially hollow cylindrical trailing pistons 11.1, 12.1 from one another. The two trailing pistons 11.1, 12.1 are received in an axially displaceable manner on the two-part, cylindrical outer lateral face of the main piston 2.1, the first trailing piston 11.1 being arranged in the first pressure chamber 8, and the second trailing piston 12.1 being arranged in the second pressure chamber 9. To damp an end stop of the three pistons 2.1, 11.1, 12.1 in the cylindrical housing 3 at the end stop faces 5, 6, in each case a mechanical damping element 21, 22 in the form of a rubber buffer is attached to the end face of the two trailing pistons 11.1, 12.1.

A piston rod 19 which is slidably mounted in the cylindrical housing 3 and protrudes axially out of the cylindrical housing 3 is attached to the main piston 2.1. The connection between the main piston 2.1 and the piston rod 19 is produced by a screw connection 20. In a known manner, the piston rod 19 is engaged with or operatively connected to a shift element of a clutch, for example a shift fork or a sliding sleeve.

To seal the two pressure chambers 8, 9, firstly a first and a second annular seal 23, 24 are arranged radially between the main piston 2.1 and in each case one of the two trailing pistons 11.1, 12.1. Moreover, a third and a fourth annular seal 25, 26 are arranged radially in each case between the two trailing pistons 11.1, 12.1 and the associated cylindrical inner lateral face of the cylindrical housing 3. Lastly, reference is made to a fifth annular seal 27, which is arranged radially between the piston rod 19 and the cylindrical housing 3 and is used to seal the first pressure chamber 8 on the piston-rod side.

The piston web 10.1 of the main piston 2.1 is used in the operation of the piston-cylinder assembly 1.1 for the two trailing pistons 11.1, 12.1 alternately as an axial counter bearing. For this purpose, the two trailing pistons 11.1, 12.1 have, on the axial end thereof close to the piston web, in each case an axially inwardly extending thrust portion 13.1, 14.1. The two trailing pistons 11.1, 12.1 are moreover at a distance from one another by means of a housing-side travel limiter 28.1 which is arranged approximately centrally in the piston chamber 7, which limiter protrudes radially inwardly from the housing wall toward the piston web 10.1 as an annular retaining web. A sliding ring 29 is fitted on the piston web 10.1, by means of which ring the main piston 2.1 is axially slidably mounted on the travel limiter 28.1 which is rigidly connected to the housing. The travel limiter 28.1 is used to limit axial travel on both sides in the travel range of the two trailing pistons 11.1, 12.1, the maximum travel ranges of the two trailing pistons 11.1, 12.1 being approximately equal.

When pressure is applied, the pressure-chamber-side end faces of the main piston 2.1 and of in each case one of the two trailing pistons 11.1, 12.1 together form an effective piston surface which always changes when the relevant trailing piston 11.1, 12.1 remains on the travel limiter 28.1, and the main piston 2.1 continues moving. Accordingly, by means of the trailing pistons 11.1, 12.1, the actuating speed at which the piston rod 19 can be axially displaced, when there is a constant actuating pressure, can be set at two speed levels.

In addition, in FIG. 4, it can be seen that the axial overall length of the known piston-cylinder assembly 1.1 is decisively determined by the width and the axial length of the piston web 10.1 of the main piston 2.1 and by the axial lengths of the two thrust portions 13.1, 14.1 of the trailing pistons 11.1, 12.1, which, in the central position in the axial direction, are located one behind the other without play. At the same time, the available installation space for transmission actuators as a result of construction and design specifications is usually extremely limited.

DE 40 38 170 A1 discloses another piston-cylinder assembly in the form of a three-position actuator, comprising a main piston and two trailing pistons, wherein, to limit the travel of the trailing pistons in a central position, a retaining web is formed on a cylindrical housing, and wherein, on the main piston, a collar, ring, web or the like is formed so that the main piston is carried along by the trailing pistons into the respective shift position.

SUMMARY

Against this background, the invention presents a piston-cylinder assembly of the type mentioned at the outset which has an even more compact design. In particular, the piston-cylinder assembly is to have a smaller overall axial length than previous technical solutions. The piston-cylinder assembly presented is additionally usable as a transmission actuator for an automatic transmission in the drive train of a vehicle.

The present disclosure is based on the finding that, in the case of the known piston-cylinder-assemblies in the form of the three-position actuator described, the radial protrusion of the main piston, against which the at least one trailing piston moves, has a closed face perpendicularly to the longitudinal axis of the piston. The trailing piston comprises a thrust piece having approximately the same outside diameter as the piston protrusion. The piston protrusion and the trailing piston thrust piece lie flat against one another when the main piston is carried along by the trailing piston. This assembly of the piston protrusion and the trailing piston thrust piece results in an unnecessarily large axial length of the piston-cylinder assembly. This can be remedied by adapting the main piston and the trailing piston to one another in a space-saving manner. In the case of an assembly comprising two trailing pistons, by means of a simple design measure which makes it possible to axially introduce some portions of the trailing pistons into the main piston on each side without obstructing one another, it was possible to reduce the axial length of the pistons lined up one behind the other from approximately double the width of the main piston protrusion. The overall axial length of a piston-cylinder assembly of this type can thus be considerably decreased.

The invention therefore proceeds from a piston-cylinder assembly, comprising a cylindrical housing, in which a main piston and at least one trailing piston are each received in an axially displaceable manner, the main piston dividing a piston chamber of the cylindrical housing into two pressure chambers having a variable volume, by means of which a pressurized fluid can be applied to the main piston on both sides and to the trailing piston on one side, the at least one trailing piston being guided in an axially displaceable manner on a cylindrical outer lateral face of the main piston which extends to the side of a circular piston web which acts as an axial counter bearing, the piston web extending radially outward from the outer lateral face of the main piston, the at least one trailing piston having a thrust portion at the end thereof which is close to the piston web, which portion extends axially inward toward the piston web, a travel limiter for limiting an axial travel range of the at least one trailing piston being arranged or formed on the cylindrical housing, and, when pressure is applied, the at least one trailing piston dragging along with the main piston by means of the thrust portion until the trailing piston hits the travel limiter.

The piston web of the main piston has an axial recess, and the thrust portion of the at least one trailing piston is formed so as to be geometrically adapted to the recess in such a way that the thrust portion can dip into the recess with a positive fit when the respective trailing piston approaches the piston web of the main piston.

Accordingly, the thrust portion of the respective trailing piston can be received in the piston web of the main piston and can move into and out of the web. As a result, the overall axial length of the assembly is accordingly decreased. In particular, the piston chamber in which the main piston and trailing pistons are received can be made smaller axially by comparison with the prior art, and thus the cylindrical housing as a whole can accordingly be designed to be shorter.

According to a first advantageous embodiment of the piston-cylinder assembly according to the invention, it can be provided that two trailing pistons are arranged in the cylindrical housing and separated from one another by a piston web which is axially centrally arranged on the main piston, that a first trailing piston, which has a first thrust portion, is guided in an axially movable manner in a first pressure chamber on the cylindrical outer lateral face of the main piston, that a second trailing piston, which has a second thrust portion, is guided in an axially movable manner in a second pressure chamber on the cylindrical outer lateral face of the main piston, and that the piston web has two axial recesses, a first recess facing the first trailing piston, and a second recess facing the second trailing piston so that each trailing piston can dip into the associated recess of the piston web when approaching the piston web.

Accordingly, in the case of a piston-cylinder assembly comprising a main piston and two trailing pistons, the two trailing pistons can move into the piston web simultaneously and thereby axially overlap one another in part. The overall axial length of the assembly consisting of the main piston and the two trailing pistons results when the piston-cylinder assembly is under pressure on both sides, and the trailing pistons rest against the piston web of the main piston on both sides. As a result of the fact that some portions of the two trailing pistons can move into the piston web simultaneously and thereby axially overlap one another, the overall length is made considerably shorter, ideally by approximately double the width of the radial protrusion of the main piston, by comparison with conventional piston-cylinder assemblies in which the end faces of the piston web and the trailing piston thrust piece rest against one another.

Axial overlap of the two trailing piston thrust portions while the two trailing pistons simultaneously approach the main piston web can be made possible in the case of one advantageous embodiment of the invention in that the first and second thrust portions of the first and second trailing pistons are each formed from a plurality of arcuate first and second thrust segments which are at a distance from one another in the circumferential direction, opposing first and second thrust segments of the trailing pistons being arranged so as to alternate with one another in the circumferential direction, and in that the first and second recesses of the piston web are each formed from a plurality of pocket-shaped first and second recess segments which are at a distance from one another in the circumferential direction. In this case, axially opposing first and second recess segments of the piston web are arranged so as to alternate with one another in the circumferential direction so that a first recess segment is assigned to each first thrust segment, and a second recess segment is assigned to each second thrust segment, which can engage in one another in pairs.

Accordingly, on the piston web of the main piston, pockets are formed in alternating portions of both end faces. The thrust portions are designed to be shorter by comparison with the outside diameter of the piston web, and to be adapted with a positive fit to the pockets. The thrust segments of the trailing pistons can then enter the pockets. The web width of the piston web, which is defined for example by a sliding ring which is provided on the outer casing of the web anyway, can thus be used effectively for the dragging process. By dividing up the pockets in an order such that they alternate with one another over the circumference, the trailing pistons can be arranged so as to axially overlap one another. As a result, the piston-cylinder assembly has a significantly shorter structure in the central position, which is decisive for the overall axial length. In addition, by saving material in the region of the recesses in the piston web, the weight, and thus the mass to be moved, can be reduced.

In addition, it can be provided that the first thrust portion of the first trailing piston has a first shoulder, that the second thrust portion of the second trailing piston has a second shoulder, that the shoulders are formed so as to be closed or non-continuous in the circumferential direction, the first shoulder acting as a first axial stop face for limiting the travel range of the first trailing piston on the travel limiter in a first axial direction and for simultaneously limiting the depth of dipping into the first recess, and the second shoulder acting as a second axial stop face for limiting the travel range of the second trailing piston on the travel limiter in a second axial direction and for simultaneously limiting the depth of dipping into the second recess.

Furthermore, it can be provided that the travel limiter for each trailing piston is in the form of a double-sided retaining web of the cylindrical housing which extends radially inward toward the piston web. The retaining web provides a simple, double-sided travel limiter. A travel limiter of this type is advantageously suitable in particular for an assembly comprising two trailing pistons.

Alternatively, it can be provided that the travel limiter for each trailing piston is in the form of a single-sided step on the cylindrical housing which extends radially inward toward the main piston. A travel limiter of this type is suitable for an assembly comprising one or two trailing pistons. The steps can be arranged axially to the piston web in such a way that a space located radially over the piston web remains free or can be saved.

According to another advantageous embodiment of the invention, it can be provided that there is only a single trailing piston which has a thrust portion and is guided on a main piston, that the main piston has a radially extending piston web which has at least one axial recess, and that the piston web is formed on the axial end face of the main piston.

In the case of an assembly comprising only one trailing piston, it is advantageous for the piston web to protrude radially not from the axial center of the main piston, but rather on the edge thereof which is at a distance from the single trailing piston. As a result, a structure can be produced in which a shoulder-shaped thrust portion of the trailing piston can dip into an axial recess of the piston web, wherein the trailing piston, some portions of which are dipped, as a whole does not extend axially beyond the piston web. A particularly compact design is thus achieved.

In one advantageous development of this embodiment, it can be provided that the piston web extends at least as far as into the axial center of the main piston, the radial outer lateral face of the piston web forming a bearing surface for attaching a functional element, such as a position detection device or a position locking device or parts thereof.

Accordingly, in the case of a three-position actuator which operates with only one trailing piston, the thrust portion of the trailing piston being able to dip into a recess of the main piston web does not only reduce the overall length. Additionally, the width of the radial piston web, which is relatively large in this embodiment, can be used to integrate functional elements on the outer casing thereof inside the cylindrical housing. This is possible in particular when the main piston is mounted and arranged in a guided manner in such a way that an axially central sliding ring on the piston web, which additionally supports the main piston with respect to the cylindrical housing, can be omitted. A functional element of this type can be for example a magnet, the magnetic field of which is detected by a Hall sensor which is at a distance radially in order to detect the precise axial position of the main piston and thus of a shift element actuated by the piston rod, such as a sliding sleeve of a transmission.

Lastly, the invention also relates to an automatic transmission of a vehicle, for example of a commercial vehicle, comprising a piston-cylinder assembly which is in the form of a three-position actuator and can act as a transmission actuator of the transmission, the piston-cylinder assembly having the above-described features of at least one of the claims.

The invention will be described in greater detail below with reference to two exemplary embodiments shown in the accompanying drawings.

DETAILED DESCRIPTION OF THE DRAWINGS

Figure 1:
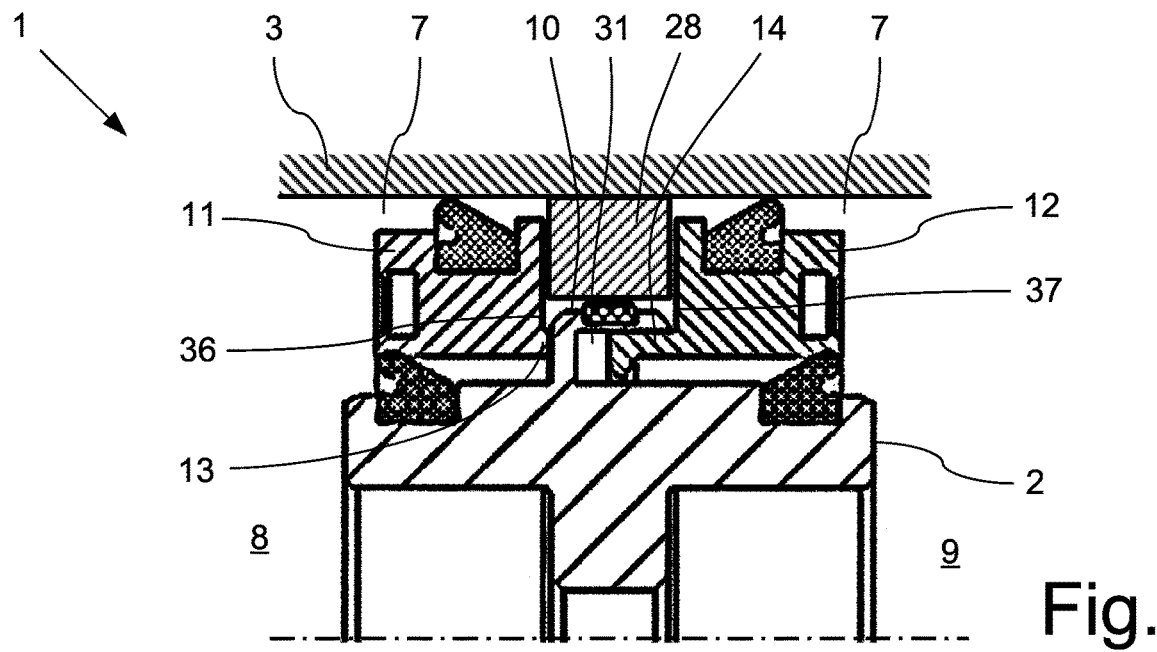
FIG. 1 is a schematic axial longitudinal sectional view of a first embodiment of a piston-cylinder assembly having the features of the invention.

Some of the components in the drawings correspond to one another in terms of the construction and/or the function thereof, and therefore, for the sake of simplicity, the components are labeled using the same reference signs.

Figure 4:
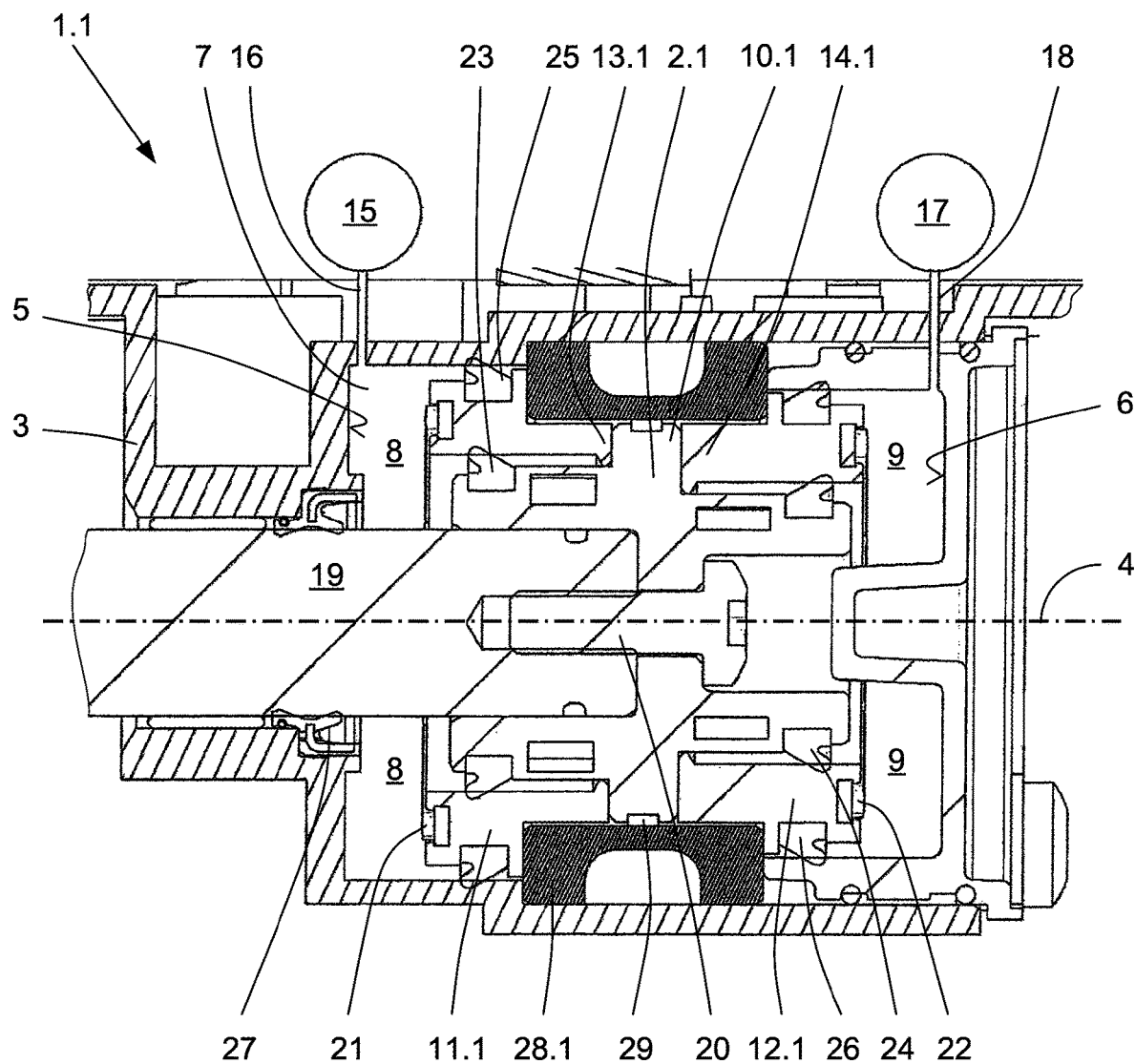
FIG. 4 is a schematic axial longitudinal section through a piston-cylinder assembly according to the prior art.

The piston-cylinder assembly 1.1 known from the prior art, which is shown in FIG. 4, has already been described at the outset. In contrast, a piston-cylinder assembly 1 according to the invention and shown in FIG. 1 and FIG. 2 comprises a main piston 2 and two trailing pistons 11, 12 in a space-saving arrangement. For this purpose, a circular piston web 10 having two opposing circular axial recesses 30, 31 is formed on the main piston 2. The first recess 30 is oriented so as to be open toward the first trailing piston 11, and the second recess 31 is oriented so as to be open toward the second trailing piston 12. In each case, two circular thrust portions 13, 14 are formed on the two trailing pistons 11, 12, the geometric shape and dimensioning of which are adapted to the two recesses 30, 31 in the main piston 2. The first trailing piston 11 accordingly has a first thrust portion 13, which is oriented toward the first recess 30 of the piston web 10. The second trailing piston 12 has a second thrust portion 14, which is oriented toward the second recess 31 of the piston web 10.

Figure 2:
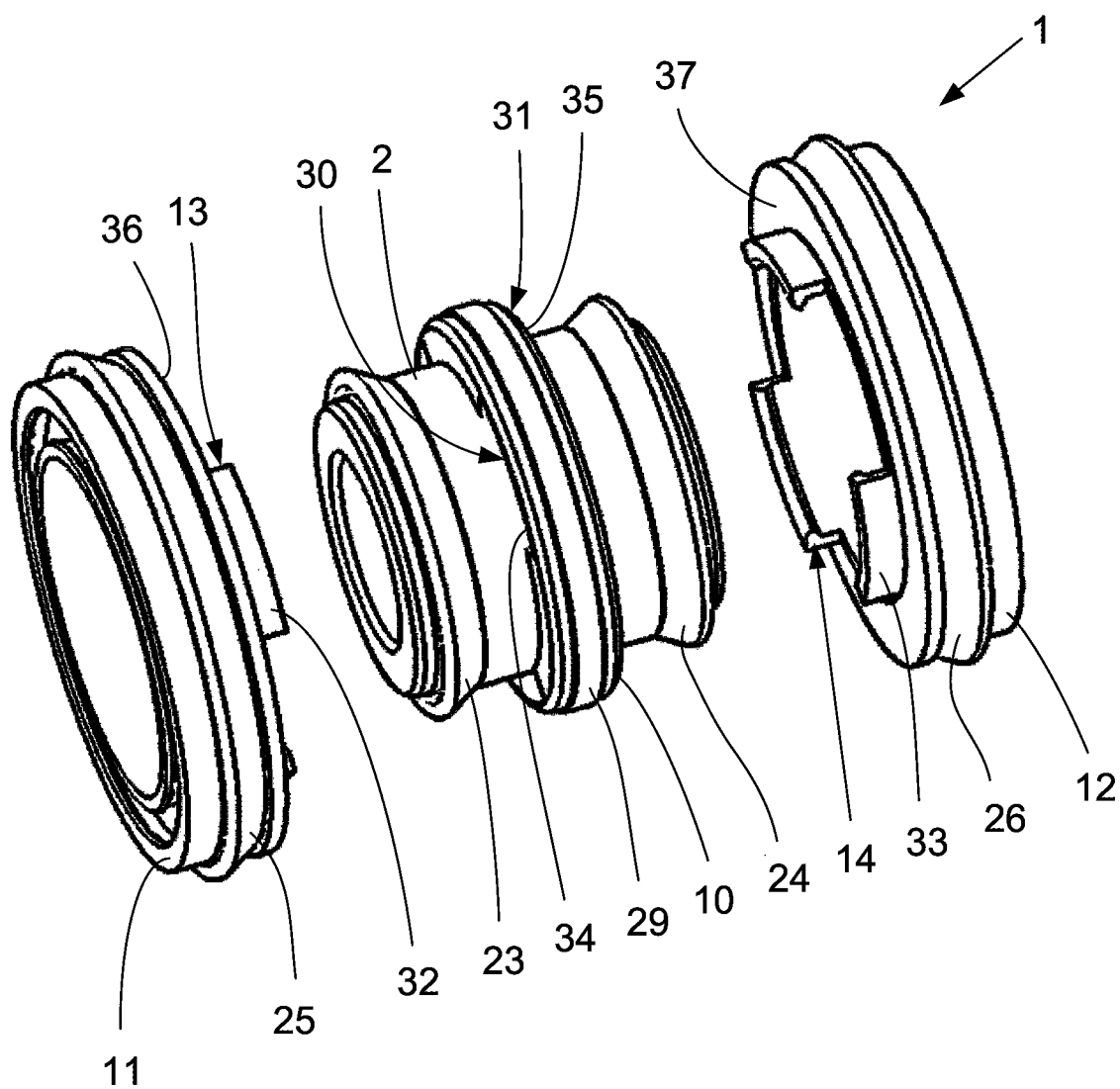
FIG. 2 is a perspective, exploded view of a piston subassembly of the piston-cylinder assembly according to FIG. 1.

In the exemplary embodiment shown, the two recesses 30, 31 of the piston web 10 are to be axially opposite one another with the same radial diameters on both sides of the piston web 10. Therefore, the recesses 30, 31 over the circumference of the piston web 10 are not formed to be continuous, but rather are divided up into arcuate recess segments 34, 35 which are in the form of pockets and alternate on both sides (FIG. 2). Accordingly, the first recess 30 consists of a plurality of first recess segments 34, which are formed so as to be distributed at a uniform distance from one another over the circumference of the piston web 10. Accordingly, the second recess 31 also consists of a plurality of second recess segments 35, and therefore the opposing first and second recess segments 34, 35 form an alternating row.

The thrust portions 13, 14 of the two trailing pistons 11, 12 are accordingly formed so as to be segmented in a suitable manner. The first thrust portion 13 of the first trailing piston 11 thus consists of a plurality of arcuate first thrust segments 32, and the second thrust portion 14 of the second trailer portion 12 consists of a plurality of second thrust segments 33. On the one axial side of the piston web 10, a first recess segment 34 is thus assigned to each first thrust segment 32. On the other side of the piston web 10, a second recess segment 35 is assigned to each second thrust segment 33, and therefore the assigned thrust segment and recess segment pairs 32, 34; 33, 35 can each engage with one another in an interlocking manner.

Furthermore, a stationary travel limiter 28 is provided on the cylindrical housing 3, which limiter is in the form of a double-sided retaining web and extends radially inward toward the piston web 10. The travel limiter 28 has approximately the same width as the piston web 10.

The first thrust portion 13 of the first trailing piston 11 has a first shoulder 36 which acts as an axial stop on the adjacent first end face of the travel limiter 28. Accordingly, the second thrust portion 14 of the second trailing piston 12 has a second shoulder 37 which acts as an axial stop on the adjacent second end face of the travel limiter 28. The two shoulders 36, 37 each additionally define the dipping depth of the trailing pistons 11, 12 into the piston web 10. In the exemplary embodiment shown, the dipping depths each reach approximately as far as the axial center of the piston web 10.

In addition, it can be seen that the main piston 2 according to FIG. 1 and FIG. 2, in contrast with the known main piston 2.1 according to FIG. 4, has a uniform outside diameter on both sides of the piston web 10. Likewise, in this case, both trailing pistons 11, 12 have equal outside diameters. However, this is not an essential requirement for the invention proposed here, but rather is to be considered merely an example.

The function of a piston-cylinder assembly 1 according to FIG. 1 and FIG. 4 is as follows:

In FIG. 1, the piston-cylinder assembly 1 is located in a central position. The central position is reached and fixed when a fluid pressure which is increased in comparison with the external pressure is present on both sides of the main piston 2 and on one side of the two trailing pistons 11, 12 respectively. The displacement forces resulting from the pressure level and the effective piston faces in each case are designed in such a way that the main piston 2 is automatically moved out of any other position into the central position, in each case one of the two trailing pistons 11, 12, as an active piston, carrying along the main piston 2 as far as the stop on the travel limiter 28 and axially dipping into the piston web 10 in part. The other trailing piston 11, 12 in each case axially moves up as far as the opposite stop on the travel limiter 28 and in this case, coming from the opposite side, likewise dips into the piston web 10 in some portions so that the main piston 2 is fixed in the central position without play, and some portions of both trailing pistons 11, 12 are moved into the main piston web 10.

However, if only one of the two pressure chambers 8, 9 is filled with pressurized fluid, and the other pressure chamber 8, 9 is simultaneously ventilated, the main piston 2 axially moves from the central position thereof with a different speed further into the corresponding first or second end position on the first or second end stop face 5, 6, the trailing piston 11, 12 to which pressure is applied remaining stationary at the travel limiter 28, and the passive trailing piston 11, 12 being carried along in a pressure-free manner as far as the axial end stop.

Figure 3:
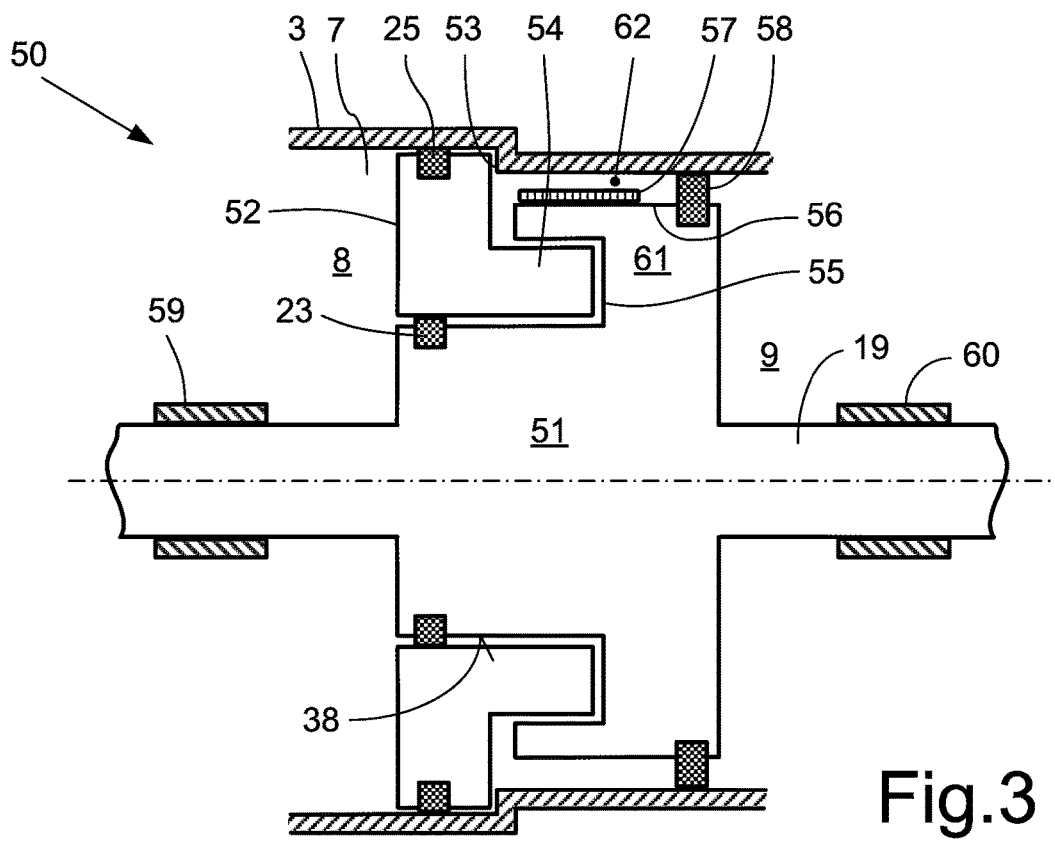
FIG. 3 is a schematic axial longitudinal sectional view of a second embodiment of a piston-cylinder assembly having the features of the invention.

FIG. 3 shows a second piston-cylinder assembly 50 having the features of the invention. The piston-cylinder assembly 50 likewise has a main piston 51 and only a single trailing piston 52 in a space-saving arrangement. For this purpose, a circular piston web 61 is formed on the main piston 51, which web radially protrudes on the axial end face of the main piston 51 and reaches as far as approximately the axial center of the main piston 51. An annular axial recess 55 is formed on the piston web 61. The associated trailing piston 52 has a thrust portion 54, part of which axially moves into the recess 55 and hits the base thereof in order to carry along the main piston 51. By means of two sliding bearings 59, 60 which are at a distance from one another axially, the main piston 51 is mounted in an axially displaceable manner in the cylindrical housing 3 by the piston rod 19 which is rigidly connected to the piston, and is sealed with respect to the cylindrical housing 3. The substantially hollow cylindrical trailing piston 52 is guided in an axially displaceable manner on an outer lateral face 38 of the main piston 51 and, in the travel range, is limited by a travel limiter 53 which is in the form of a radially inwardly pointing step on the cylindrical housing 3. To seal the first pressure chamber 8 on the trailer-piston side, an annular seal 23 is arranged radially between the main piston 51 and the trailing piston 52. Moreover, an annular seal 25 is arranged radially between the trailing piston 52 and an associated cylindrical inner lateral face of the cylindrical housing 3. To seal the opposing second pressure chamber 9, an annular seal 58 is arranged radially between the main piston 51 and the inner lateral face of the cylindrical housing 3.

A clearance 62 remains between the outer casing of the piston web 61 and the cylindrical housing 3. As shown, the clearance 62 can be used to arrange a functional element 57 on a radial bearing surface 56 on the outer casing of the piston web 61. This can be for example a magnet of a Hall sensor device, by means of which an axial position detection of the main piston 51 or of a control element which is connected thereto by the piston rod 19 is made possible.

While the above description constitutes the preferred embodiments of the present invention, the invention is susceptible to modification, variation and change without departing from the proper scope and fair meaning of the accompanying claims.

The invention claimed is:

1. A piston-cylinder assembly (1, 50), comprising:
a cylindrical housing (3),
a main piston (2, 51), and
at least one trailing piston (11, 12, 52),
wherein the main piston and the at least one trailing piston are disposed in the cylindrical housing in an axially displaceable manner, the main piston (2, 51) dividing a piston chamber (7) of the cylindrical housing (3) into two pressure chambers (8, 9) having a variable volume, configured to supply a pressurized fluid to the main piston (2, 51) on two opposite sides and to the at least one trailing piston (11, 12, 52) on one side, the at least one trailing piston (11, 12, 52) being guided in an axially displaceable manner on a cylindrical outer lateral face (38) of the main piston (2, 51) which extends to the side of a circular piston web (10, 61) acting as an axial counter bearing, the piston web (10, 61) extending radially outward from an outer lateral face (38) of the main piston (2, 51), the at least one trailing piston (11, 12, 52) having a thrust portion (13, 14, 54) at an end proximate to the piston web, the thrust portion extending axially inward toward the piston web (10, 61),
wherein the cylindrical housing includes a travel limiter (28, 53) for limiting an axial travel range of the at least one trailing piston (11, 12, 52)
wherein, under pressure, the at least one trailing piston (11, 12, 52) follows the main piston (2, 51) via the thrust portion (13, 14, 54) until the trailing piston (11, 12, 52) hits the travel limiter (28, 53),
wherein the piston web (10, 61) of the main piston (2, 51) has an axial recess (30, 31, 55), and the thrust portion (13, 14, 54) of the at least one trailing piston (11, 12, 52) is geometrically adapted to the axial recess (30, 31, 55) to be insertable into the recess (30, 31, 55) with a positive lock when the respective trailing piston (11, 12, 52) approaches the piston web (10, 61) of the main piston (2, 52).

2. The piston-cylinder assembly according to claim 1, wherein the at least one trailing piston is two trailing pistons (11, 12) arranged in the cylindrical housing (3) and separated from one another by the piston web (10), which is axially centrally arranged on the main piston (2),
wherein a first trailing piston (11) of the two trailing pistons, which has a first thrust portion (13), is guided in an axially movable manner in a first pressure chamber (8) on the cylindrical outer lateral face of the main piston (2),
wherein a second trailing piston (12) of the two trailing pistons, which has a second thrust portion (14), is guided in an axially movable manner in a second pressure chamber (9) on the cylindrical outer lateral face of the main piston (2), and
wherein the piston web (10) has two axial recesses (30, 31), a first recess (30) facing the first trailing piston (11), and a second recess (31) facing the second trailing piston (12) so that each trailing piston (11, 12) is insertable into an associated recess (30, 31) of the piston web (10) when approaching the piston web (10).

3. The piston-cylinder assembly according to claim 2, wherein the first and second thrust portions (13, 14) of the two trailing pistons (11, 12) are each formed from a plurality of arcuate first and second thrust segments (32, 33) circumferentially spaced from one another and radially opposite from each other so as to circumferentially alternate with one another, wherein the first and second recesses (30, 31) of the piston web (10) are each formed from a plurality of pocket-shaped first and second recess segments (34, 35) which are circumferentially spaced from one another, axially opposing first and second recess segments (34, 35) of the piston web (10) so that each of the first recess segments (34) is assigned to a respective one of the first thrust segments (32), and each of the second recess segments (35) is assigned to a respective one of the second thrust segments (33) for engaging one another in pairs.

4. The piston-cylinder assembly according to claim 2, wherein the first thrust portion (13) of the first trailing piston (11) has a first shoulder (36), wherein the second thrust portion (14) of the second trailing piston (12) has a second shoulder (37), wherein the first and second shoulders (36, 37) are circumferentially closed or non-continuous, the first shoulder (36) acting as a first axial stop surface for limiting the travel range of the first trailing piston (11) on the travel limiter (28) in a first axial direction and simultaneously limiting an insertion depth into the first recess (30), and the second shoulder (37) acting as a second axial stop surface for limiting the travel range of the second trailing piston (12) on the travel limiter (28) in a second axial direction and simultaneously limiting an insertion depth into the second recess (31).

5. The piston-cylinder assembly according to claim 1, wherein a respective travel limiter (28) for each of the at least one trailing piston (11, 12) is a double-sided retaining web of the cylindrical housing (3) which extends radially inward toward the piston web (10).

6. The piston-cylinder assembly according to claim 1, wherein a respective travel limiter (53) for each of the at least one trailing piston (52) is a single-sided step on the cylindrical housing (3) which extends radially inward toward the main piston (51).

7. The piston-cylinder assembly according to either claim 1, wherein the at least one trailing piston is only one trailing piston (52).

8. The piston-cylinder assembly according to claim 7, wherein the piston web (61) extends into the axial center of the main piston (51), and wherein an outer lateral face of the piston web (61) forms a bearing surface (56) for attaching a functional element (57) of a position detection device.

9. The piston-cylinder assembly according to claim 7, wherein the piston web (61) extends into the axial center of the main piston (51), and wherein an outer lateral face of the piston web (61) forms a bearing surface (56) for attaching a functional element (57) of a position locking device.

10. An automatic transmission of a vehicle, comprising a piston-cylinder assembly (1, 50) according to claim 1, forming a three-position actuator and configured as a transmission actuator of the automatic transmission.

* * * * *